US010986135B2

(12) United States Patent
Molloy et al.

(10) Patent No.: US 10,986,135 B2
(45) Date of Patent: *Apr. 20, 2021

(54) ADVANCED ASSET TRACKING AND CORRELATION

(71) Applicant: Qualys, Inc., Foster City, CA (US)

(72) Inventors: Sean M. Molloy, Parker, CO (US); Matthew L. Wirges, West Bend, WI (US); Amol S. Sonawane, Redwood Shores, CA (US)

(73) Assignee: Qualys, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/730,551

(22) Filed: Dec. 30, 2019

(65) Prior Publication Data

US 2020/0137122 A1     Apr. 30, 2020

Related U.S. Application Data

(63) Continuation of application No. 16/030,719, filed on Jul. 9, 2018, now Pat. No. 10,523,713, which is a (Continued)

(51) Int. Cl.
*H04L 29/06* (2006.01)
*G06F 16/245* (2019.01)
*G06F 16/2457* (2019.01)
*G06F 16/903* (2019.01)
*G06F 40/205* (2020.01)

(52) U.S. Cl.
CPC ............ *H04L 63/20* (2013.01); *G06F 16/245* (2019.01); *G06F 16/24578* (2019.01); *G06F 16/90335* (2019.01); *G06F 40/205* (2020.01); *H04L 63/1408* (2013.01); *H04L 63/1433* (2013.01)

(58) Field of Classification Search
None
See application file for complete search history.

(56) References Cited

U.S. PATENT DOCUMENTS 5,734,720 A    3/1998  Salganicoff
6,029,195 A    2/2000  Herz
(Continued)

OTHER PUBLICATIONS

Kim, Mijung et al., "Efficient Static and Dynamic In-Database Tensor Decompositions on Chunk-Based Array Stores", CIKM'14, Nov. 3-7, 2014, Shanghai, China, pp. 969-978.

*Primary Examiner* — Michael Pyzocha
(74) *Attorney, Agent, or Firm* — Baker & McKenzie LLP

(57) ABSTRACT

A security management system may be remotely deployed (e.g., using a cloud-based architecture) to add security to an enterprise network. For example, the security management system may scan assets within the enterprise network for vulnerabilities and may receive data from these scans. The security management system may also receive data from other sources, and, as a result, the system may handle data having many different formats and attributes. When the security management system tries to associate data to assets, there may not be a globally unique identifier that is applicable for all received data. Provided in the present disclosure are exemplary techniques for tracking assets across a network using an asset correlation engine that can flexibly correlate data with assets based on attribute information.

20 Claims, 8 Drawing Sheets

Related U.S. Application Data continuation of application No. 15/451,135, filed on Mar. 6, 2017, now Pat. No. 10,021,140, which is a continuation of application No. 14/624,335, filed on Feb. 17, 2015, now Pat. No. 9,591,027.

(56) References Cited

U.S. PATENT DOCUMENTS

| | | |
|---|---|---|
| 9,117,075 B1 * | 8/2015 | Yeh .................. G06F 21/56 |
| 9,202,249 B1 | 12/2015 | Cohen et al. |
| 2002/0198980 A1 | 12/2002 | Najafi |
| 2003/0220926 A1 * | 11/2003 | Huelsman .............. G06N 5/02 |
| 2006/0178954 A1 | 8/2006 | Thukral et al. |
| 2007/0022027 A1 * | 1/2007 | Gupta .................. G06Q 40/025 |
| | | 705/35 |
| 2007/0130026 A1 | 6/2007 | O'Pray et al. |
| 2008/0010231 A1 * | 1/2008 | Perazolo .............. G06N 5/025 |
| | | 706/48 |
| 2010/0094878 A1 | 4/2010 | Soroca et al. |
| 2010/0235362 A1 | 9/2010 | Cormode et al. |
| 2012/0303561 A1 | 11/2012 | Sathish |
| 2013/0054518 A1 | 2/2013 | Anglin et al. |
| 2014/0114819 A1 * | 4/2014 | Olsen ................ G06Q 30/0202 |
| | | 705/30 |
| 2014/0164443 A1 | 6/2014 | Genc et al. |
| 2014/0188993 A1 | 7/2014 | Klein et al. |
| 2014/0195664 A1 | 7/2014 | Rahnama |
| 2014/0358616 A1 | 12/2014 | Berkland et al. |
| 2015/0094097 A1 | 4/2015 | Fraccaroli |
| 2015/0331858 A1 | 11/2015 | Thibaut et al. |
| 2016/0055532 A1 | 2/2016 | Connolly et al. |
| 2016/0171400 A1 | 6/2016 | Bastide et al. |
| 2016/0232116 A1 | 8/2016 | Bone et al. |
| 2016/0248496 A1 | 8/2016 | Bellamkonda et al. |

* cited by examiner

ADVANCED ASSET TRACKING AND CORRELATION

CROSS-REFERENCE TO RELATED APPLICATIONS

The present application is a continuation of U.S. patent application Ser. No. 16/030,719 filed Jul. 9, 2018 entitled "Advanced Asset Tracking and Correlation," which is a continuation of U.S. patent application Ser. No. 15/451,135 filed Mar. 6, 2017 entitled "Advanced Asset Tracking and Correlation," issued as U.S. Pat. No. 10,021,140, which is a continuation of U.S. patent application Ser. No. 14/624,335 filed Feb. 17, 2015 entitled "Advanced Asset Tracking and Correlation," issued as U.S. Pat. No. 9,591,027, which are all incorporated herein by reference in their entirety for all purposes.

TECHNICAL FIELD

The present application generally relates to tracking assets in a network, and, more specifically, to systems and methods for correlating data chunks received from the network with the assets using an asset database and a plurality of asset attributes for identification.

BACKGROUND

An enterprise network may often comprise many connected assets such as desktop workstations, servers, laptops, tablets, and other devices that are used during the regular course of business. Each asset may introduce a source of vulnerability for the enterprise network, especially if it is accessible from outside of the enterprise network. Over time, the assets within the enterprise network may be removed, added, or changed, and some of the assets may be used outside of the enterprise network.

A cloud-based security management system may be deployed to monitor and promote the security of the enterprise network. For example, the security management system may assess vulnerabilities of particular assets within the network as well as the network as a whole. The security assessments and other activities related to the enterprise network may cause the security management system to receive data packets or other functional groupings of information about assets within the network which may sometimes be collectively referred to herein as data chunks.

SUMMARY

During operation, the security management system may receive data blocks, asset records, or other groups of data referred to herein as "data chunks" from disparate sources and relating to assets under management by the security management system. Such data chunks may use a plurality of different formats and may comprise varying sets of attributes. It may therefore be challenging to find and use any single attribute or identifier to associate all of the different types of data chunks with the correct assets.

Disclosed are systems and methods for tracking assets and correlating data chunks having varying attributes associated with the assets to asset entries within an asset database, where the asset entries may represent the assets. The data chunks may be parsed to determine what attributes are available to provide hints about the target assets to which the data chunks relate. An asset correlation engine may use a correlation metric, which may comprise a scoring algorithm with a plurality of attribute weights, to score and match each data chunk with an asset entry in the asset database. When the asset correlation engine does not find any matching asset entries (e.g., having a score above a threshold value), the asset correlation engine may create a new asset entry in the asset database to which the data chunk may be matched.

The asset entries may have some attributes that are multivalued and other attributes that are single-valued. When the asset correlation engine matches a data chunk to an asset entry, the attributes of the data chunk may be used to update the attributes of the asset entryso that similar data chunks may more easily be matched with the asset entry in later instances. For example, if the data chunk comprises a value for an attribute, and the asset entry does not comprise a value for that attribute, the data chunk's attribute value may be added to the asset entry. In the case of a multivalued attribute, if the asset entry already contains one or more values for the attribute but not the value present in the matched data chunk, the data chunk's value may be added to the one or more values of the asset entry. If the asset entry and the matched data chunk have differing values for a single-valued attribute, the asset entry's original value may be replaced by that of the matched data chunk. The scoring algorithm may be deterministic such that any data chunks having a common subset of available attributes and the same values for each attribute in the common subset of available attributes may be associated with the same asset entry, andthus the same target asset, even as the asset database evolves over time.

The correlation metric may be adjustable by a user. For example, the user may establish an exclusion rule for an attribute that, when satisfied by the attribute's value from a received data chunk, causes the asset correlation engine to disregard the attribute and corresponding values when scoring asset entries against the received data chunk. The exclusion rule may test an attribute value of a data chunk against a single value or a range of values. If the attribute value is alphanumeric, a regular expression may be used to establish the condition or conditions in which the attribute may be nullified.

BRIEF DESCRIPTION OF DRAWINGS

Features, aspects, and embodiments of the disclosure are described in conjunction with the attached drawings, in which.

Figure 1A:
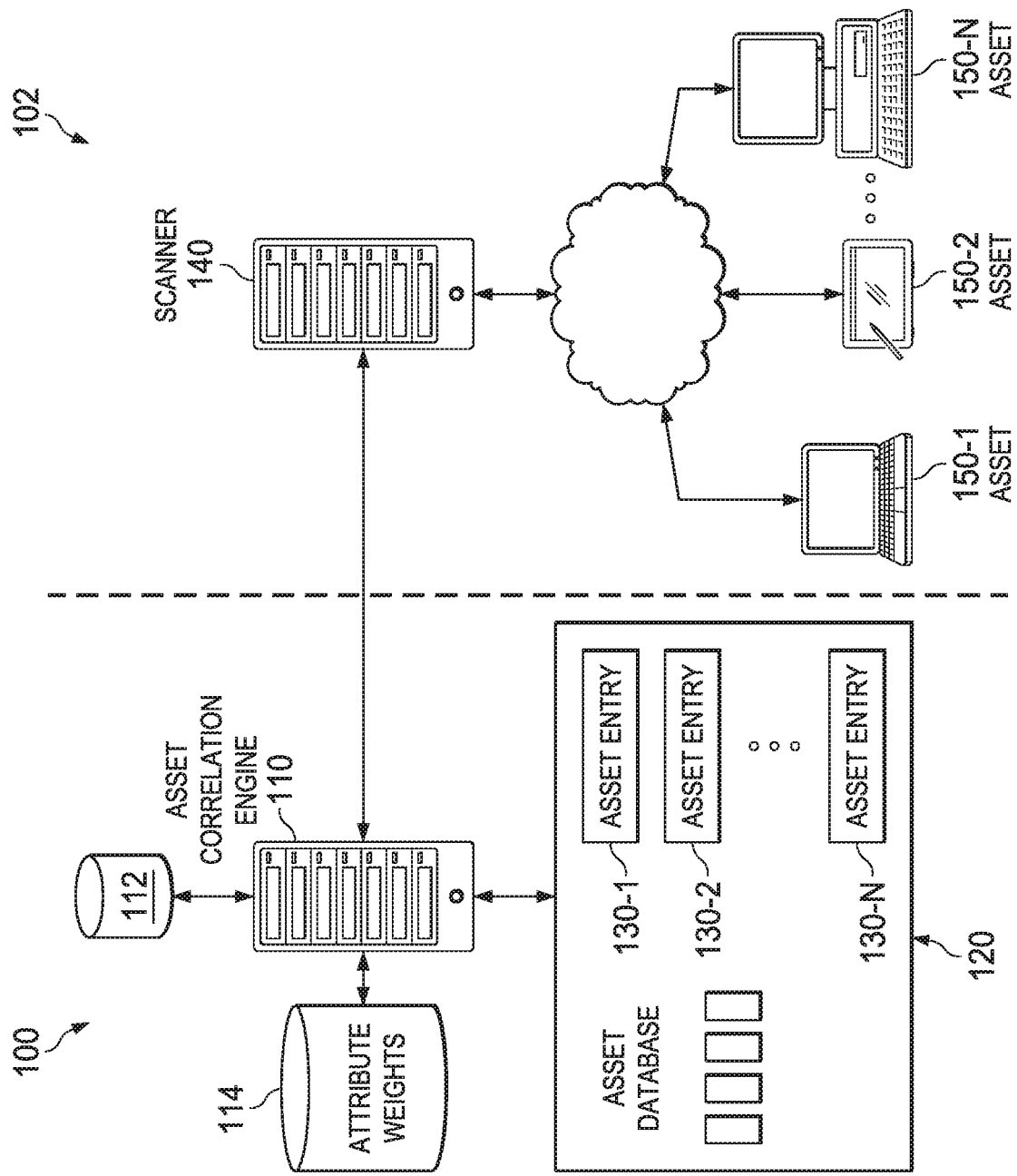
FIG. 1A shows a block diagram illustrating a security management system operable to collect asset data from a user site.

These exemplary figures and embodiments are to provide a written, detailed description of the subject matter set forth by any claims that issue from the present application. These exemplary figures and embodiments should not be used to limit the scope of any such claims.

Further, although similar reference numerals may be used to refer to similar structures for convenience, each of the various example embodiments may be considered to be distinct variations. In addition, the drawings are not to scale unless explicitly indicated otherwise.

DETAILED DESCRIPTION

In some embodiments, a system for identifying target assets. The system comprises: an asset correlation engine executable by one or more computing device processors and in communication with an asset database, wherein the asset database is operable to store asset entries, wherein at least one asset entry in the asset database is associated with an asset, and wherein the asset correlation engine is operable to: access correlation information comprising attribute information associated with one or more assets, wherein the system is operable to: receive data associated with a target asset of a network, wherein the target asset comprises at least one of a desktop workstation, a server, a laptop, a tablet, a mobile phone, an application, a virtual machine, and a computing device; parse the data to identify a target attribute associated with the target asset, wherein the target attribute comprises at least one of an IP address attribute, a DNS name attribute, a network attribute, an operating system attribute, a NetBIOS name attribute, an agent identification attribute, a software attribute, a hardware attribute, and an instance identification attribute; access exclusionary rules associated with attributes; determine, based on the exclusionary rules associated with the attributes, whether the target attribute is excludable; in response to determining the target attribute is not excludable, determine, based on the correlation information, target attribute information associated with the target attribute; determine, based on the target attribute information associated with the target attribute, target asset information, wherein a second target attribute excluded by the exclusionary rules is not used in determining the target asset information; determine whether the target asset information at least partially correlates with an asset entry in the asset database; and in response to determining the target asset information at least partially correlates with the asset entry in the asset database, process the target asset information.

In some embodiments, the attribute information comprises attribute weight information, and wherein the target attribute information comprises target attribute weight information.

In some embodiments, at least one of the correlation information, the attribute information, or the target attribute information is associated with a category.

In some embodiments, the processing the target asset information comprises associating the target asset information with the at least partially correlated asset entry in the asset database.

In some embodiments, the target asset information is comprised in a digital fingerprint.

In some embodiments, the correlation information or the attribute information is generated using an iterative training process.

In some embodiments, the iterative training process comprises iteratively testing candidate attribute weight information, and determining whether the candidate attribute weight information leads to an expected correlation result for mapping test target asset information with test asset entry information.

In some embodiments, the asset correlation engine is further operable to receive the data from an agent operable to scan the target asset.

In some embodiments, the agent comprises or is a cloud agent.

In some embodiments, the target asset comprises at least one of the desktop workstation, the server, the laptop, the tablet, the mobile phone, the application, the virtual machine, and the computing device In some embodiments, a method is provided for identifying target assets, the method comprising: accessing, using one or more computing device processors, correlation information comprising attribute information associated with one or more assets; accessing, using the one or more computing device processors, exclusionary rules associated with attributes; receiving, using the one or more computing device processors, data associated with a target asset of a network, wherein the target asset comprises at least one of a desktop workstation, a server, a laptop, a tablet, a mobile phone, a virtual machine, and a computing device; parsing, using the one or more computing device processors, the data associated with the target asset of the network to identify a target attribute associated with the data, wherein the target attribute comprises at least one of an IP address attribute, a DNS name attribute, a network attribute, an operating system attribute, a NetBIOS name attribute, an agent identification attribute, a software attribute, a hardware attribute, and an instance identification attribute; determining, using the one or more computing device processors, based on the exclusionary rules associated with the attributes, whether the target attribute is excludable; in response to determining the target attribute is not excludable, determining, using the one or more computing device processors, based on the correlation information, target attribute information associated with the target attribute; determining, using the one or more computing device processors, based on the target attribute information associated with the target attribute, target asset information, wherein a second target attribute excluded by the exclusionary rules is not used in generating the target asset information; determining, using the one or more computing device processors, whether the target asset information at least partially correlates with an asset entry in an asset database, wherein the asset database is operable to store asset entries, wherein at least one asset entry in the asset database is associated with an asset; and in response to determining the target asset information at least partially correlates with the asset entry in the asset database, processing, using the one or more computing device processors, the target asset information.

In some embodiments, the data is received using a cloud-based agent.

In some embodiments, the processing the target asset information comprises associating the target asset information with the at least partially correlated asset entry in the asset database.

In some embodiments, the attribute information comprises attribute weight information, and wherein the target attribute information comprises target attribute weight information.

In some embodiments, the method comprises in response to determining the target asset information does not at least partially correlate with the asset entry in the asset database, creating a new asset entry in the asset database, wherein the new asset entry comprises at least a portion of the target asset information.

In some embodiments, determining whether the target asset information at least partially correlates with the asset entry in the asset database, comprises scanning, based on at least a portion of the target asset information or the target attribute information, the asset entries in the asset database, and determining at least partially matching or correlating asset entries.

In some embodiments, determining whether the target asset information at least partially correlates with the asset entry in the asset database, comprises determining, based on the target asset information or the target attribute information, and using at least one fuzzy matching technique, whether the target asset information at least partially correlates with at least one asset entry in the asset database.

In some embodiments, a method is provided for identifying target assets, the method comprising: accessing, using the one or more computing device processors, exclusionary rules associated with attributes; receiving, using the one or more computing device processors, data associated with a target asset of a network, wherein the target asset comprises at least one of a desktop workstation, a server, a laptop, a tablet, a mobile phone, a virtual machine, and a computing device; parsing, using the one or more computing device processors, the data associated with the target asset of the network to identify a target attribute associated with the data, wherein the target attribute comprises at least one of an IP address attribute, a DNS name attribute, a network attribute, an operating system attribute, a NetBIOS name attribute, an agent identification attribute, a software attribute, a hardware attribute, and an instance identification attribute; determining, using the one or more computing device processors, target attribute information associated with the target attribute; determining, using the one or more computing device processors, based on the target attribute information associated with the target attribute, a digital fingerprint for the target asset; determining, using the one or more computing device processors, based on the digital fingerprint for the target asset, whether a target asset information associated with the target attribute information at least partially correlates with an asset entry in an asset database, wherein the asset database is operable to store asset entries, wherein at least one asset entry in the asset database is associated with an asset.

In some embodiments, the method further comprises in response to determining the target asset information at least partially correlates with the asset entry in the asset database, identifying, using the one or more computing device processors, the target asset.

In some embodiments, the data is received using a cloud-based agent.

In some embodiments, a system is provided for identifying target assets. The system comprises: an asset correlation engine executable by one or more computing device processors and in communication with an asset database, wherein the asset database is operable to store asset entries, wherein at least one asset entry in the asset database is associated with an asset, and wherein the asset correlation engine is operable to: access a correlation metric, the correlation metric comprising: attributes, wherein at least one attribute is associated with a particular attribute weight, and exclusionary rules associated with the attributes; receive a data chunk associated with a target asset of a network; parse the data chunk to identify an attribute associated with the data chunk; determine, based on accessing the exclusionary rules associated with the attributes, whether the attribute is excludable; in response to determining the attribute is not excludable, determining, based on accessing the correlation metric, an attribute weight associated with the attribute; generate, based on the attribute weight associated with the attribute, target asset information, wherein a second attribute excluded by the exclusionary rules is not used in generating the target asset information; determine, based on the target asset information, whether the data chunk matches an asset entry in the asset database; and in response to determining the data chunk at least partially matches the asset entry in the asset database, associate the data chunk with the asset entry in the asset database.

In some embodiments, the attribute is at least one of a strongly correlated attribute, a moderately correlated attribute, and a loosely correlated attribute.

In some embodiments, a first attribute weight of the strongly correlated attribute is greater than a second attribute weight of the moderately correlated attribute, or wherein the second attribute weight of the moderately correlated attribute is greater than a third attribute weight of the loosely correlated attribute.

In some embodiments, a first attribute weight of the strongly correlated attribute is at least 1.5 to 40 times as large as a second attribute weight of the moderately correlated attribute, or the second attribute weight of the moderately correlated attribute is at least 1.5 to 25 times as large as a third attribute weight of the loosely correlated attribute.

In some embodiments, the target asset information is comprised in a digital fingerprint.

In some embodiments, the attribute weights for the attributes comprised in the correlation metric are generated using an iterative training process.

In some embodiments, the iterative training process comprises iteratively testing candidate attribute weights for the attributes comprised in the correlation metric, and determining whether the candidate attribute weights lead to an expected matching result for mapping a test target asset with a test asset entry.

In some embodiments, the target asset comprises at least one of a desktop workstation, a server, a laptop, a tablet, a mobile phone, and a virtual machine, or the attribute comprises at least one of an IP address attribute, a DNS name attribute, a network attribute, an operating system attribute, a NetBIOS name attribute, an agent identification, and an instance identification.

In some embodiments, the asset correlation engine is further operable to receive the data chunk from an agent operable to scan the target asset.

In some embodiments, the agent comprises a cloud agent.

In some embodiments, a method is provided for identifying target assets, the method comprising: accessing, using one or more computing device processors, a correlation metric, the correlation metric comprising: attributes, wherein at least one attribute is associated with a particular attribute weight, and exclusionary rules associated with the attributes; receiving, using the one or more computing device processors, a data chunk associated with a target asset of a network; parsing, using the one or more computing device processors, the data chunk to identify an attribute associated with the data chunk; determining, using the one or more computing device processors, based on accessing the exclusionary rules associated with the attributes, whether the attribute is excludable; in response to determining the attribute is not excludable, determining, using the one or more computing device processors, based on accessing the correlation metric, an attribute weight associated with the attribute; generating, using the one or more computing device processors, based on the attribute weight associated with the attribute, target asset information, wherein a second attribute that is excluded by the exclusionary rules is not used in generating the target asset information; determining, using the one or more computing device processors, based on the target asset information, whether the data chunk matches an asset entry in an asset database, wherein the asset database is operable to store asset entries, wherein at least one asset entry in the asset database is associated with an asset; and in response to determining the data chunk at least partially matches the asset entry in the asset database, associating, using the one or more computing device processors, the data chunk with the asset entry in the asset database.

In some embodiments, the data chunk is received using an agent.

In some embodiments, the agent is a cloud-based agent.

In some embodiments, the target asset comprises an IP address.

In some embodiments, the method further comprises in response to determining the data chunk does not at least partially match the asset entry in the asset database, create a new asset entry in the asset database, and associate the data chunk with the new asset entry in the asset database.

In some embodiments, determining, based on the target asset information, whether the data chunk matches an asset entry in the asset database, comprises scanning, based on the target asset information, the asset entries in the database and determining a list of potentially matching asset entries.

In some embodiments, determining, based on the target asset information, whether the data chunk matches the asset entry in the asset database, comprises determining, based on the target asset information and using at least one fuzzy matching technique, whether the data chunk matches the asset entry in the asset database.

In some embodiments, a method is provided for identifying target assets, the method comprising: accessing, using one or more computing device processors, a correlation metric, the correlation metric comprising: attributes, wherein each attribute is associated with a particular attribute weight, and exclusionary rules associated with the attributes; receiving a data chunk associated with a target asset of a network; parsing the data chunk to identify an attribute associated with the data chunk; determining, using the one or more computing device processors, based on accessing the correlation metric, an attribute weight associated with the attribute; generating, using the one or more computing device processors, based on the attribute weight associated with the attribute, a digital fingerprint for the target asset; determining, using the one or more computing device processors, based on the digital fingerprint for the target asset, whether the data chunk matches an asset entry in an asset database, wherein the asset database is operable to store asset entries, wherein at least one asset entry in the asset database is associated with an asset; and in response to determining the data chunk at least partially matches the asset entry in the asset database, associating, using the one or more computing device processors, the data chunk with the asset entry in the asset database.

FIG. 1A shows a block diagram illustrating a security management system 100 operable to collect asset data from a user site 102. The security management system 100 may be provided remotely from the user site 102. For example, the security management system 100 may be distributed over a cloud computing environment and may provide cloud-based network security to the user site 102. In some embodiments, the security management system 100 and the user site 102 may be collocated.

The user site 102 may have a plurality of assets 150-1, 150-2, 150-N, which may comprise desktop workstations, servers, laptops, tablets, mobile phones, and other devices. The assets 150 may also comprise virtual machines or computing instances that are hosted from external cloud-based services (e.g., Amazon EC2, Microsoft Azure), within the user site 102, or any combination thereof. An exemplary embodiment involving virtual machines serving as assets 150 will be further described in FIG. 1C.

A scanner 140 may be deployed to scan and collect data about the assets 150 within the user site 102. While FIG. 1C shows the scanner 140 located at the user site 102, the scanner 140 may also be located remotely, such as within the security management system 100. Remote scanners may be suitable for scanning publically facing devices (e.g., web servers), whereas local scanners (e.g., the scanner 140 of FIG. 1C) may be well-positioned to detect vulnerabilities within a private network.

The scanner 140 may gather network topology data that provides a list of the assets 150 within the user site 102. The scanner 140 may further receive or otherwise determine attributes and other information about the assets 150. For example, the scanner 140 may periodically target the assets 150 within the user site 102 to determine vulnerability information or to monitor policy compliance. The scanner 140 may relay collected data to the security management system 100 in packets or other functional groupings of information that will hereafter be referred to as data chunks.

A data chunk may be most useful if it is known to relate to a particular asset 150. For example, if a data chunk reveals a detected vulnerability, it would be valuable for anetwork security administrator to know which asset 150 possesses the detected vulnerability. In the simplest systems, a single identifying attribute could be used, where the identifying attribute is unique to each asset 150 within the system, constant over time, and included in each data chunk associated with all of the assets 150. In practice, however, no single attribute may have all of these characteristics for all assets 150 within the system.

Instead, data chunks may have varying sets of attributes, depending on factors suchas the path by which the data chunk reaches the security management system 100, the data source that generates the data chunk (e.g., the scanner 140), and the nature of the data chunk itself. For example, some data chunks may provide an internet protocol (IP) address of the asset 150-1, whereas other data chunks may instead comprise a Network Basic Input/Output System (NetBIOS) name that may relate to the same asset 150-1. Other potentially viable attributes for identification include a Domain Name System (DNS) name, agent identification (e.g., an identification prepared by an agent running on an asset 150), instance identification (e.g., associated with a virtual machine instance), a network towhich the asset 150 is connected, and an operating system of the asset 150. In general, each data chunk may comprise one or more attributes that provide varying degrees of reliability in identifying the corresponding asset 150, and no single attribute may be included on all incoming data chunks.

In accordance with the disclosed principles, the security management system 100 may comprise an asset correlation engine 110 and an asset database 120 in communication with one another. The asset correlation engine 110 may analyze incoming data chunks and associate them with known assets represented by asset entries 130 in the asset database 120. In the present embodiment, the asset entries 130-1, 130-2, and 130-N are associated with the assets 150-1, 150-2, and 150-N, respectively.

After parsing attribute information from an incoming data chunk, the asset correlation engine 110 may utilize a correlation metric comprising a scoring algorithm with attribute weights 114 to associate incoming data chunks with the asset entries 130. The scoring algorithm and the attribute weights 114 may be accessible and/or implemented by the asset correlation engine 110. The attribute weights 114 may represent the relative value of each attribute. The asset correlation engine 110 may be in further communication with a memory device 112, where the memory device 112 comprises machine-readable instructions that, when executed, allow the asset correlation engine 110 to perform the actions and functionality described herein. In some embodiments, the attribute weights 114, the instructions of the memory device 112, and/or one or more asset entries 130 may reside on the same memory device.

When analyzing a data chunk to determine the correct asset entry 130 and corresponding asset 150 that should be attributed to or matched with the data chunk, the asset correlation engine 110 may compute the weighted scores for the asset entries 130 in the asset database 120. The weighted score for a selected asset entry, A, may be calculated as $$\text{Score}(A) = \sum_{i=1}^{N} M_i W_i \qquad \text{Eq. (1)}$$

where i iterates from 1 to N to represent each of N attributes, $M_i$ is the match result for the $i^{th}$ attribute, and $W_i$ is the weight for the $i^{th}$ attribute. If the data chunk and the selected asset entry both provide a value for the $i^{th}$ attribute, the match result $M_i$ may equal 1 if the values match, and $M_i$ may equal −1 if the values do not match. The match result $M_i$ may equal 0 if the data chunk, the selected asset entry, or both the data chunk and the selected asset entry do not provide a value for the $i^{th}$ attribute. In other words, $M_i$ may be set to 0 when a comparison cannot be made for the $i^{th}$ attribute due to missing information.

The data chunk may generally provide a single value, if at all, for each of the N attributes. However, an asset entry 130 may hold multiple values for one or more of the N attributes. For example, an asset 150 may be detected from different networks at different times, and the asset's corresponding asset entry 130 may thus have multiple values under a network attribute, and the number of values under the network attribute may grow as the asset 150 is detected from new networks over time. When the selected asset entry 130 holds multiple values for an $i^{th}$ attribute, the match result $M_i$ may be equal to 1 if any of the multiple values for the selected asset entry 130 match the value for the $i^{th}$ attribute in the data chunk, and the match result $M_i$ may be equal to −1 if none of the multiple values for the selected asset entry 130 match the value for the $i^{th}$ attribute in the data chunk.

The weights $W_i$ of Eq. (1) may be the attribute weights 114 available to the asset correlation engine 110. The weights 114 may be fixed and predetermined base on testing as will be described below with respect FIG. 3, or the weights 114 may be established and/or updated after deployment of the security management system 100.

Some attributes may have larger contributions to the score when a positive match occurs than when a negative match occurs, or vice versa. To allow for these scenarios, either $M_i$ or $W_i$ may be changed to distinguish the magnitude of the effects of positive and negative matches. For example, instead of simply using $W_i$, the asset correlation engine 110 may implement both a positive weight $W_{i+}$ and a negative weight $W_{i-}$ for the same attribute.

In some embodiments, the weights 114 may additionally or alternatively be user-adjustable. In some embodiments, a user may exclude or nullify score contributions for an attributes under certain (or all) conditions. For example, a user may know that an IPv4 address space of 10.10.10.0 to 10.10.10.255 is associated with a portion of a private network where IP addresses are dynamically assigned with a short lease time, making these IPv4 addresses less useful in identifying assets. Accordingly, the user may establish an exclusion rule that states that an IPv4 address in a data chunk should not be considered (e.g., Wi is set to 0) if the IPv4 address is within this range. The exclusion rules may beestablished for one or more attributes using single values or ranges of values.

As another example, a user may wish to exclude a DNS name attribute from asset score calculation if the attribute's value (e.g., an alphanumeric DNS name) is a transmuted version of the IPv4 address and would likely not contribute any more information than is provided by the IPv4 address attribute. If a particular domain is known to perform such actions, an exclusion rule may be created to detect scenarios where the DNS name is provided by that domain. For example, an exclusion rule may check the value of the DNS name attribute against a regular expression such as "*.networks.corp.com," where "*" is a wildcard operator. If the value of the DNS name attribute matches the regular expression provided by the exclusion rule, the DNS name attribute may be ignored (e.g., Wi is set to 0).

By summing the weighted contributions of each attribute, a score may be determined for the selected asset entry 130 that conveys the likelihood that the selected asset entry 130 corresponds with the data chunk. In general, a higher score may mean that the selected asset entry is more likely to correspond with the data chunk. As asset entries 130 correspond with actual assets 150, the scores can provide insight into which of the assets 150 the data chunk relates.

If the score is above a threshold value (e.g., 0) the asset correlation engine 110 may determine that the selected asset entry 130 and the data chunk are a potential match. If the asset correlation engine 110 finds that a data chunk potentially matches multiple asset entries 130, the asset correlation engine 110 may associate the highest scoring assetentry 130 with the data chunk. Further, the data chunk (or a subset of data within the data chunk) may be sent to other engines (e.g., a reporting engine) and/or storage devices with information indicating the data chunk has been matched to an asset entry 130.

If the asset correlation engine 110 determines that a newly received data chunk does not likely correspond to any of the known asset entries 130 (e.g., all scores are below the threshold value), the asset correlation engine 110 may create a new asset entry 130 to which this first data chunk may be associated. When the asset correlation engine 110 subsequently receives a second data chunk having the same set of attribute values as the first data chunk, the asset correlation engine 110 may associate the second data chunk with the same asset entry 130 that was created for and associated with the first data chunk.

The deterministic nature of the scoring algorithm and the correlation metric may allow the system 100 to closely track the assets 150 and to limit the creation of new asset entries 130.

While a single asset correlation engine 110 is shown in FIG. 1A, it is to be understood that a plurality of asset correlation engines 110 may be used. For example, whenever the security management system 100 receives new data chunks, the data chunks may be added to an assignment queue, and multiple asset correlation engine 110 may service the assignment queue. Other techniques for achieving parallelization may additionally or alternatively be implemented. Exemplary techniques for matching data chunks to assets entries 130 are further described below with respect to FIGS. 4-6.

Figure 1B:
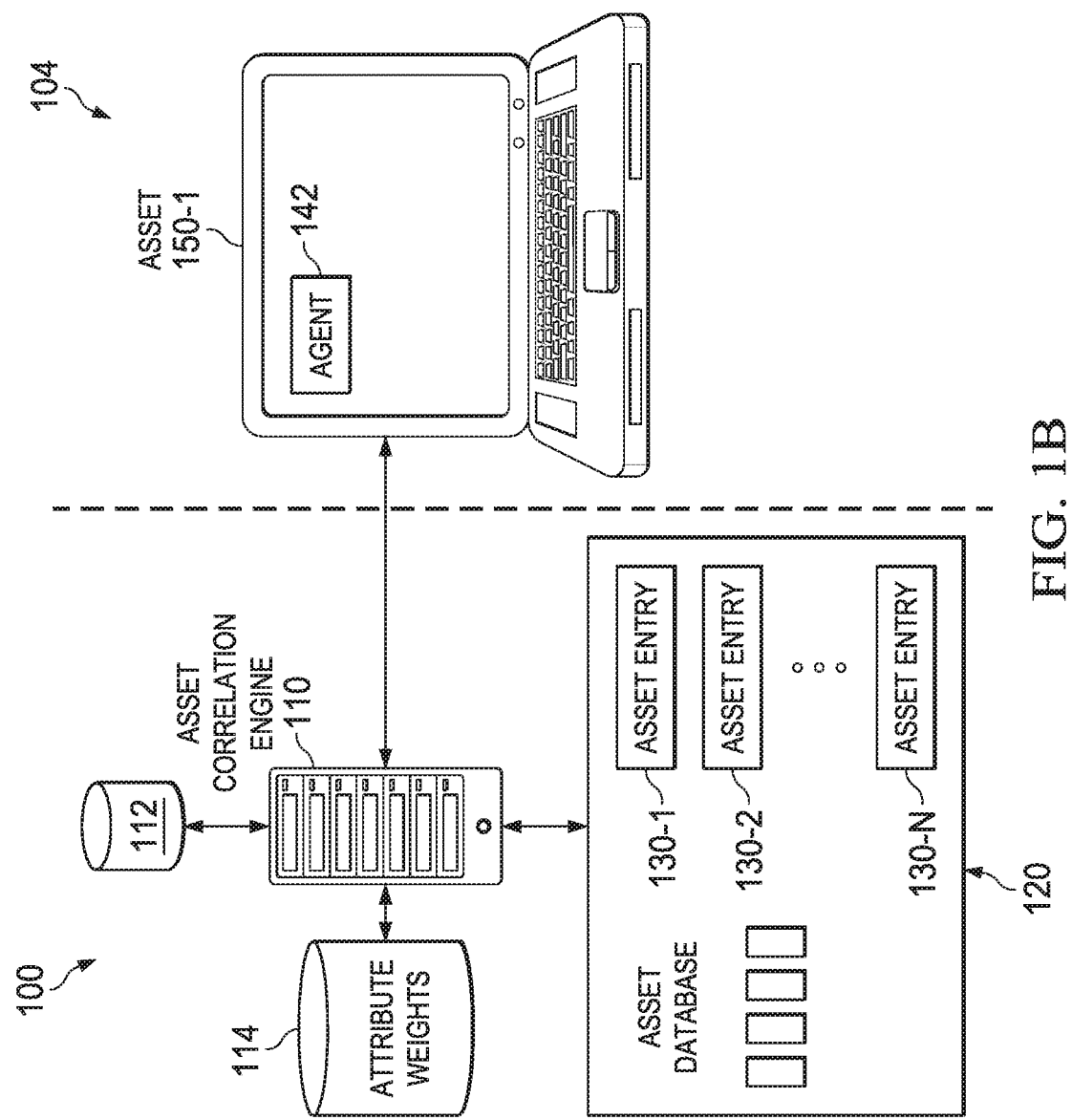
FIG. 1B shows a block diagram illustrating a security management system operable to collect asset data from an uncontrolled site.
Figure 1C:
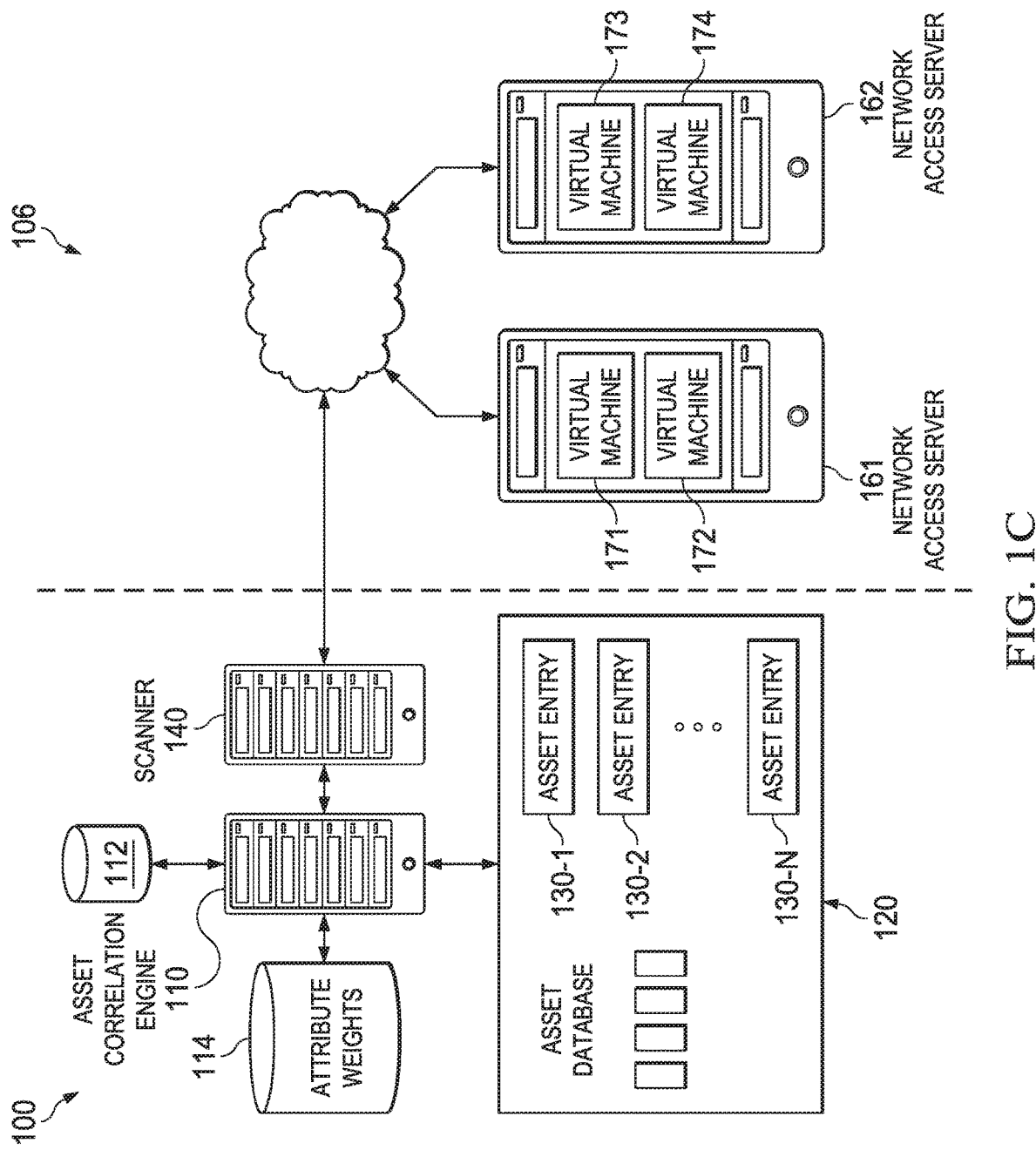
FIG. 1C shows a block diagram illustrating a security management system operable to collect asset data from a cloud-based storage network.

FIG. 1B shows a block diagram illustrating a security management system 100 operable to collect asset data from an uncontrolled site 104. Certain elements of FIG. 1B are also present in FIG. 1A, and a description of these elements will not be repeated as their operation in the embodiment of FIG. 1B will be the same or similar.

The uncontrolled site 104 may be a public location such as an airport or coffee shop with Wi-Fi. An asset 150-1 that was previously shown as within the user site 102 of FIG. 1A may be moved to the uncontrolled site 104, where it may initiate communication with the security management system 100 through an agent 142. The agent 142 may be installed on or otherwise associated with the asset 150-1 such that the agent 142 may perform vulnerability scans and/or compliance-related scans on the asset 150-1. After or while performing these scans, the agent 142 may provide the scan results and any intermediate data as data chunks to the security management system 100.

The data chunks sent from the agent 142 in the uncontrolled site 104 may contain different types and/or values of attributes than data chunks sent from a scanner within a user site, even though the data chunks may relate to the same asset 150-1 in both scenarios. For example, the IP address (e.g., IPv4 and/or IPv6) provided in these data chunks may be different from the IP address associated with the asset 150-1 when the asset 150-1 is at the user site. However, certain attributes may remain constant in both scenarios, such as a NetBIOS name. The scoring algorithm and attribute weights may be optimized such that the relative scoring contributions of the attributes may allow data chunks relating to the asset 150-1 to be reliably associated with the asset entry 130-1 across different scenarios such as these.

Upon matching a data chunk from the agent 142 to the asset entry 130-1 for the first time, new attributes may become associated with the asset entry 130-1. For example, the agent 142 may send agent identification (e.g., an alphanumeric identifier) that is unique to the asset 150-1 and written onto a local memory device of the asset 150-1. This agent identification may thereafter be present in data chunks that originate when the agent 142 scans the asset 150-1. Once the asset entry 130-1 incorporates the agent identification as an attribute, subsequent data chunks sent by the agent 142 of the asset 150-1 may be more easily associated with the asset entry 130-1 (e.g., even if the NetBIOS name of the asset 150-1 changes at a later time). As agent identification is specially created to provide reliable identification of assets 150, it may receive a relatively large weight compared to other attributes such as IP addresses. In some embodiments, agent identification may be weighted 10 to 70 times as heavily as an IPv4 address attribute. In some embodiments, agent identification may be weighted 40 to 60 times as heavily as an IPv4 address attribute to reflect the high reliability of agent identification while also balancing the value of verification provided by an IPv4 address match.

FIG. 1C shows a block diagram illustrating a security management system 100 operable to collect asset data from a cloud-based storage network 106. Certain elements of FIG. 1C are also present in FIGS. 1A-1B, and a description of these elements will not be repeated as their operation in the embodiment of FIG. 1C will be the same or similar.

The cloud-based storage network 106 may comprise a plurality of network access servers 161, 162. At the moment of time presented in FIG. 1C, the network access server 161 may host a plurality of virtual machines 171, 172, and the network access server 162 may host a second plurality of virtual machines 173, 174. The network access servers 161, 162 may selectively instantiate and de-instantiate each virtual machine. When a virtual machine is de-instantiated, it may be re-instantiated on a different network access server at a later time, with certain attributes such as instance identification being preserved between instances.

In the presented embodiment, a scanner 140 may reside within the security management system 100 and outside of the cloud-based storage network 106, so that the scanner 140 may emulate a typical attacker of the cloud-based storage network 106. In other embodiments, however, the scanner 140 may be deployed within the cloud-based storage network 106.

The scanner 140 may scan both of the network access servers 161 and 162 to determine vulnerabilities and attributes associated with the network access servers 161 and 162. After or while the network access servers 161 and 162 are scanned, the asset correlation engine 110 may receive data chunks about the network access servers 161 and 162, which the asset correlation engine 110 may match to distinct asset entries 130 in the asset database 120. The scanner 140 may also scan and determine attribute information about any virtual machines (e.g., the virtual machines 171, 172, 173, and 174) running on the network access servers 161, 162. As a result, the asset database 120 may comprise distinct asset entries 130 corresponding to the virtual machines 171, 172, 173, and 174, where the asset entries 130 for the virtual machines 171, 172, 173, and 174 differ from one another and from the asset entries 130 associated with the network access servers 161 and 162. Accordingly, the security management system 100 may monitor and isolates vulnerabilities on both hardware assets (e.g., network access servers and other physical devices) and software assets (e.g., virtual machines).

As instance identification is relatively constant and unique for each virtual machine, it may be weighted relatively heavily, much like agent identification. However, certain cloud-based services have been known to re-use or change instance identification for virtual machines, and so instance identification does not provide a definite solution, even when it is available.

The cloud-based storage network 106 may be dispersed across multiple physical locations. For example, the cloud-based storage network 106 may be located at one or more use sites and/or one or more sites provided by an external cloud-based service (e.g., Amazon EC2, Microsoft Azure). In some embodiments, the cloud-based storage network 106 may be shared by multiple business entities (e.g., as a public cloud), and in other embodiments, the cloud-based storage network 106 may service a single business entity or customers of that business entity (e.g., as a private cloud).

It is to be understood that the scenarios described by FIGS. 1A-1C are provided for exemplary purposes only and are non-limiting. An asset correlation engine 110 may receive and evaluate attribute data to identify assets across a wide range of network topologies and connectivity scenarios, including those not having scanners 140 or agents 142. In general, the correlation metric may be established (e.g., through the attribute weights) so as to provide asset correlation over these and a multitude of other scenarios. As technology evolves, new types of assets and network topologies may be developed, and the correlation metric may be updated to incorporate new attributes and/orweights to increase the metric's viability in these new scenarios.

Figure 2A:
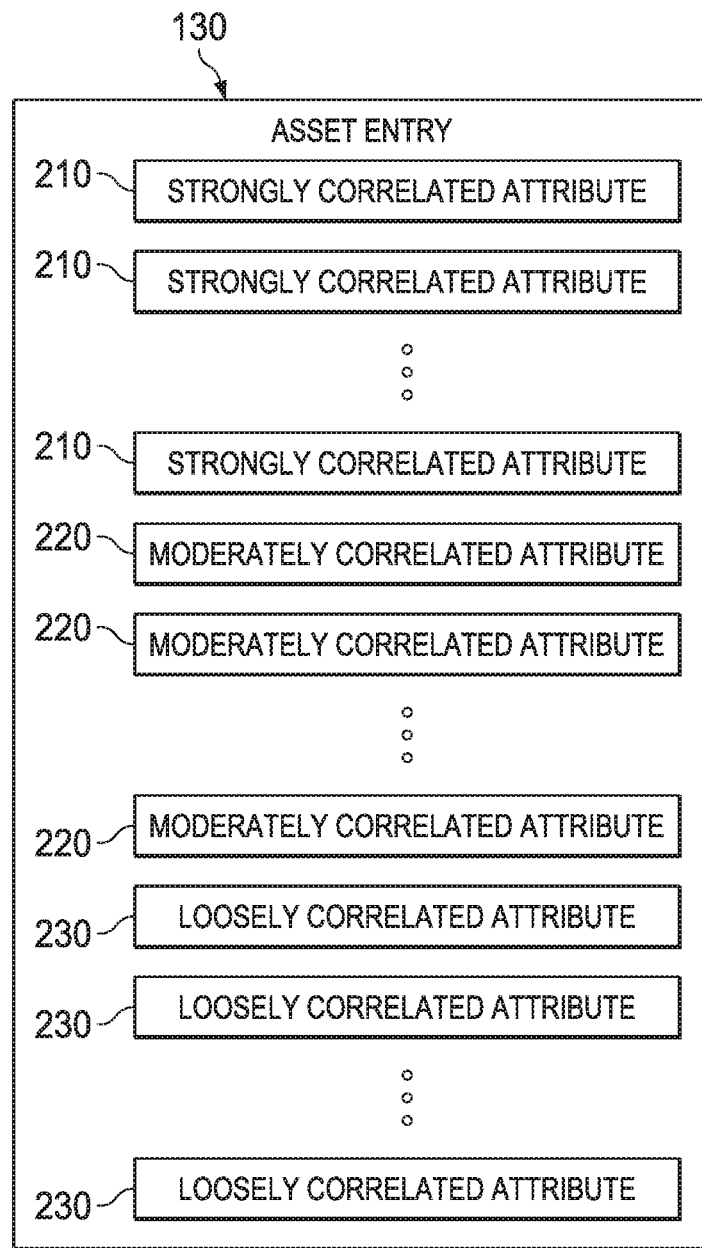
FIG. 2A shows a block diagram illustrating an asset entry that may be stored in an asset database.

FIG. 2A shows a block diagram illustrating an asset entry 130 that may be stored in an asset database. As discussed above, some attributes may be weighted differently than other attributes when calculating asset scores for matching data chunks and asset entries. In the embodiment shown in FIG. 2A, some attributes 210 may be strongly correlated to the asset entry 130, such as agent identification and instance identification. Other attributes 220 may be moderately correlated to the asset entry 130, such as a DNS name. Still other attributes 230 may be loosely correlated to the asset entry 130, such as an operating system or even an IP address. The particular categorizations of attributes may vary in different embodiments.

The loosely correlated attributes 230 (and, to some extent, even the moderately correlated attributes 220) may act primarily as hints to which asset a data chunk relates, and multiple of such attributes may together provide a partial digital fingerprint that is sufficient to identify an asset associated with the data chunk even without requiring any of the strongly correlated attributes 210 to be present in the data chunk. Additionally, the loosely correlated attributes 230 and the moderately correlated attributes 220 may serve to increase or decrease the likelihood of a prediction based primarily on a strongly correlated attribute 210. Or, the loosely correlated attributes 230 and the moderately correlated attributes 220 may "break a tie" if two strongly correlated attributes 210 suggest differing results. This leads to greater accuracy than selecting a single attribute for asset tracking.

The attributes 210, 220, 230 may be associated with weights to reflect their relative importance when the asset scores are being computed. In some embodiments, the strongly correlated attributes 210 may be weighted 1.5 to 40 times as heavily as the moderately correlated attributes 220, and the moderately correlated attributes 220 may be weighted 1.5 to 25 times as heavily as the loosely correlated attributes 230. In some embodiments, the strongly correlated attributes 210 may be weighted 10 to 30 times as heavily as the moderately correlated attributes 220, and the moderately correlated attributes 220 may be weighted 2 to 5 times as heavily as the loosely correlated attributes 230.

While three groupings of attributes are shown in FIG. 2A, greater or fewer groupings of attributes may be present in other embodiments. In some embodiments, the attributes may each have unique weights that may be distributed across a wide and substantially continuous spectrum of weights.

Some attributes may be single-valued. For example, an asset may have a NetBIOS name that is rarely changed. If the NetBIOS name is changed, and the asset becomes recognized with the new NetBIOS name, the corresponding asset entry may be updated such that the previous value of the single-valued NetBIOS attribute is replaced with the newly detected value.

Other attributes may be multivalued. For example, an asset may be detected at different networks, depending on where the asset is located at the time of the scan (e.g., in the office, at home, or even at a coffee shop). As the asset connects from new locations, the multivalued network attribute of the corresponding asset may comprise a growing listof values.

While not shown in FIG. 2A, the asset entry 130 may have an additional and unique attribute, such as a primary key, that allows the asset entry 130 to be indexed and retrieved from the asset database.

Figure 2B:
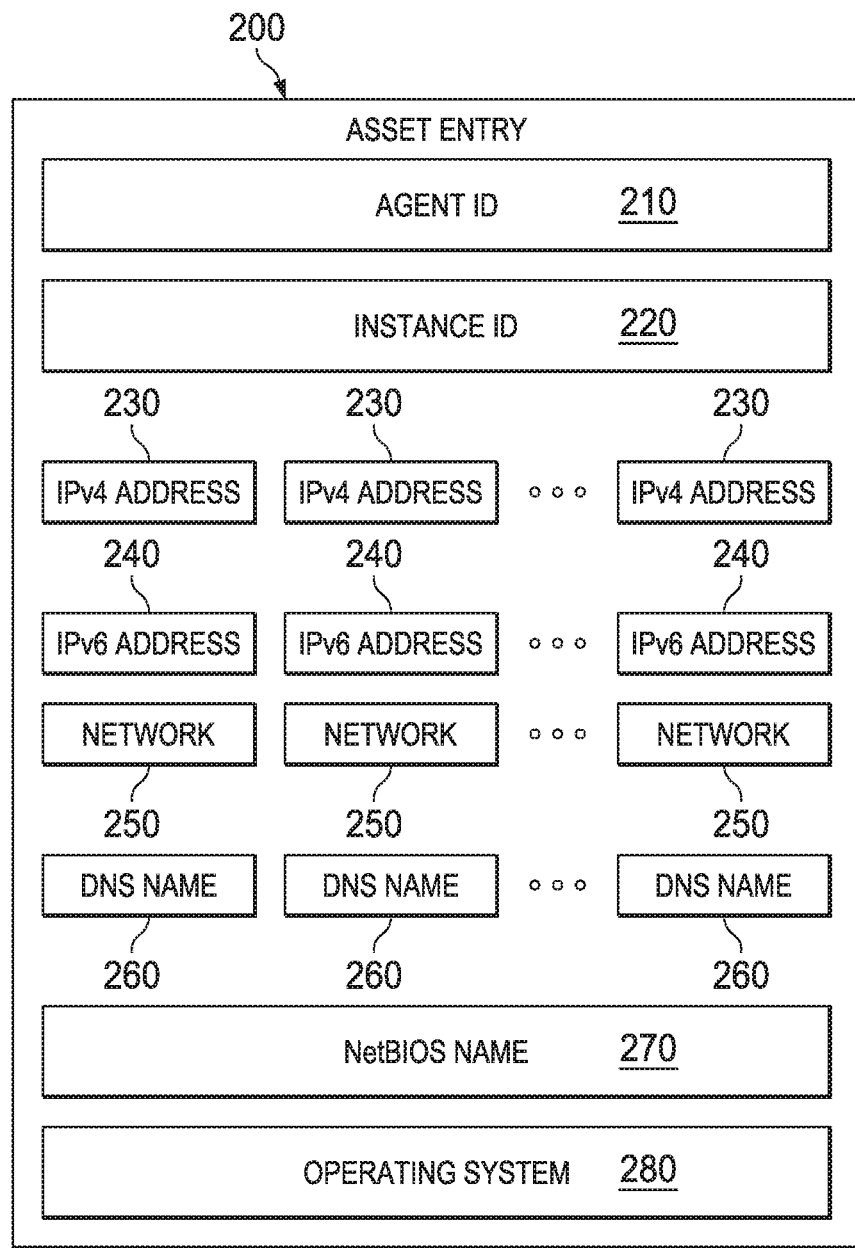
FIG. 2B shows a block diagram illustrating an exemplary asset entry having eight types of attributes.

FIG. 2B shows a block diagram illustrating an exemplary asset entry 200 having eight types of attributes. In particular, the asset entry 200 may have agent identification (ID) 210, instance identification (ID) 220, an Internet Protocol version 4 (IPv4) address attribute 230, an Internet Protocol version 6 (IPv6) address attribute 240, anetwork attribute 250, a Domain Name System (DNS) name attribute 260, a NetBIOS name attribute 270, and an operating system attribute 280. As shown in FIG. 2B, some of the attributes may allow for multiple values to be associated with the asset entry 200, and other attributes may allow a single value to be associated with the asset entry 200. The attributes presented in FIG. 2B are for exemplary purposes only, and more, fewer, or different attributes may be chosen to represent asset entries for tracking assets. Additionally, not all attributes may be known or even applicable to every asset being tracked.

The agent ID 210 may be a globally unique, alphanumeric identifier written by an agent onto a storage medium associated with an asset. While the agent ID 210 may be highly accurate in correctly identifying the asset entry and asset associated with an incoming data chunk, the agent ID 210 may not always be available. For example, the agent ID 210 may be available when the data chunk results from an upload by an agent running on an asset, but the agent ID 210 may not be available if the same asset is scanned by a scanner.

The instance ID 220 may be a relatively constant alphanumeric identifier associated with a virtual machine environment. The instance ID 220 may persist across multiple instances or sessions of a virtual machine environment and may be independent of the network access server or servers hosting each virtual machine instance. Accordingly, the instance ID 220 may be a strong indicator of an asset. However, like the agent ID 210, the instance ID 220 may be available in limited scenarios, such as those where the asset is a virtual machine instance. In some embodiments, a network access server or other hardware hosting a virtual machine instance may be classified as a separate asset from the virtual machine instance.

The IPv4 address attribute 230 may be a multivalued attribute that indicates one or more IPv4 addresses through which an asset has been detected. In some scenarios, such as where the asset is behind a router with network address translation NAT), the IPv4 address may not refer directly to the asset but instead to an intermediate node connected to the asset. Similarly, the IPv6 address attribute 240 may be a multivalued attribute that indicates one or more IPv6 addresses through which an asset has been detected.

The network attribute 250 may be a multivalued attribute that indicates one or more networks from which an asset is known to connect to the internet. The network attribute 250 may, for example, indicate the service set identification (SSID) associated with a wireless network within the home of an asset's primary user. The network attribute 250 may alternatively or additionally comprise other representations of a network such as a workgroup name as used by assets having a Microsoft Windows operating system.

The Domain Name System (DNS) name attribute 260 may be a multivalued attribute that indicates one or more DNS names assigned to an asset. The DNS name attribute 260 may comprise a name from a hierarchical naming system that is either private (e.g., for a single enterprise) or public. In general, the DNS name attribute 260 may be a globally unique identifier, but it may vary based on the location of an asset (e.g., whetherthe asset is at a home, office, or public location).

The NetBIOS name attribute 270 may be associated with the session layer of an internet protocol (IP) stack. While it may be a useful hint in verifying the identity of an asset, the NetBIOS name may not be guaranteed to be unique, even within a network, and may thus be weighted less than the agent ID and/or the instance ID in some embodiments.

The operating system attribute 280 may represent the operating system of an asset, and in some scenarios (e.g., when an agent is used), the operating system 280 may provide additional details such as patch versions. As many devices may use the same operating system, the operating system attribute 280 may not be a particularly useful identifier on its own. However, the operating system attribute 280 may complement other attributes well. Additionally, the operating system attribute 280 may serve as a relatively strong indicatorin determining when an asset does not match an asset entry 200. That is, when a datachunk is marked as having a different value for the operating system attribute 280 than that of an asset entry 200, this may strongly suggest that the data chunk is related to a differentas set entry 200 and asset. Accordingly, the operating system attribute 280 may have a negative weight that is greater in magnitude than the same attribute's positive weight. As a result, a mismatch of the operating system attribute 280 may play a larger role in determining whether a data chunk matches an asset entry 200 than would a match of the operating system attribute 280. In general, attributes may have different weight magnitudes for positive matches and negative matches (e.g., mismatches).

While not shown in FIG. 2B, the asset entry 200 may have an additional and unique attribute, such as a primary key, that allows the asset entry 200 to be indexed and retrieved from the asset database.

In some embodiments, the attributes may be ranked by their relative ability to positively identify an asset, and each attribute may have a unique weight that reflects the attribute's relative rank. For example, the attributes may be ranked as follows, in order of increasing weight: the IPv4 address attribute 230 (e.g., having the lowest weight), the IPv6 address attribute 240, the network attribute 250, the DNS name attribute 260, the operating system attribute 280, the NetBIOS name attribute 270, the instance ID 220, and the agentID 210 (e.g., having the highest weight). However, numerous other relative rankings and/or weight-based asset identification systems may be implemented in other embodiments.

Again, the attributes presented in FIG. 2B and any descriptions of their relative weights are for exemplary purposes only, and other sets and types of attributes are contemplated. For example, a media access control (MAC) address attribute may be included, when available, for each asset entry 200. The MAC address attribute may be valuable because it is globally unique, but it may also be challenging to obtain because it is generally available only to nearby devices sharing a physical network segment. Accordingly, in embodiments where scanners are implemented within routers and networking equipment in a user site, a MAC address attribute may be practical.

Figure 3:
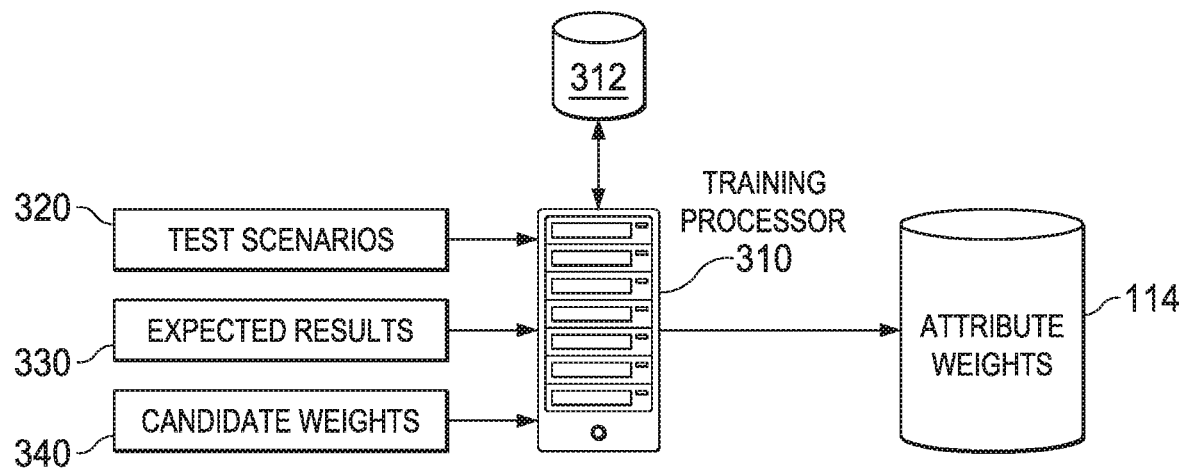
FIG. 3 shows a block diagram illustrating a system for generating a set of attribute weights.

FIG. 3 shows a block diagram illustrating a system for generating a set of attribute weights 114. In some embodiments, the attribute weights 114 may be finalized before deployment of an asset correlation engine as shown in FIG. 1. In other embodiments, the attribute weights 114 may be varied over time, for example, based on newly discovered attributes in the data chunks.

A training processor 310 may receive a series of test scenarios 320. For example, the test scenarios 320 may be pairs of data chunks that may have similar or the same values for some attributes and different values for other attributes. The training processor 310 may also receive expected results 330 corresponding to the test scenarios 320, where the expected results may indicate whether the pairs of data chunks of the test scenarios 320 should or should not be attributed to the same asset.

The selection of a finalized set of attribute weights 114 may be an iterative process. A plurality of seeded, random, or pseudo-random sets of candidate weights 340 may each be tested using the test scenarios 320 to determine the success of each set of candidate weights 340 at reaching the expected results 330. Certain test scenarios 320 may be more important than others, and a candidate set of attribute weights 340 may need to correctly match the expected results 330 for these high-priority test scenarios 320 to be potentially selected as the final attribute weights 114, or to progress to the next stage in an iterative process (e.g., using genetic algorithms). An example of a high-priority test scenario 320 may be where the attributes associated with the IP address (e.g., IPv4 and/or IPv6), agentID, and NetBIOS name match, but certain other attributes are not present or do not match. This scenario 320 may have the expected result 330 that a match is declared, and a set of attribute weights 340 may need to generate this expected result 330 to become the final set of attribute weights 114, or to progress to the next stage in an iterative process.

In some embodiments, attributes may be weighted differently for positive matches than they would for negative matches (e.g., mismatches). For example, an operating system mismatch may have a higher effect on the asset score (e.g., subtracting 300 points) than would a match (e.g., adding 100 points). As another example, a matching network attribute may have a higher effect on the asset score than would a mismatch, because an asset may be expected to connect from more than one network, and a mismatch may simply indicate that the asset is connecting from a new network.

In embodiments where the attributes are assigned across two or more tiers (e.g., highly correlated attributes, moderately correlated attributes, and loosely correlated attributes), the training processor 310 may determine which attributes belong in which tiers as well as the relative weights for each tier. Attributes within a tier may also have distinct weights from one another.

The training processor 310 may be in further communication with a memory device 312, where the memory device 312 comprises machine-readable instructions that, when executed, allow the training processor 310 to perform the actions and functionality described herein. While a single training processor 310 is shown in FIG. 3, it is to be understood that a plurality of training processors 310 may be used. For example, each training processor 310 may evaluate a subset of all sets of candidate weights 340 across the test scenarios 320, and the training processors 310 may collectively compare successful candidate weights 340 to determine a final set of attribute weights 114 or which candidate sets 340 progress to the next stage in an iterative process. Additionally or alternatively, parallelization may be achieved by distributing the test scenarios 320 across multiple training processors 310, such that each training processor 310 is responsible for a subset of all available test scenarios 320. Numerous other techniques for achieving parallelization may be implemented. Additionally, user selections may supplement, adjust, or replace the weights selected by the training processer 310.

Figure 4:
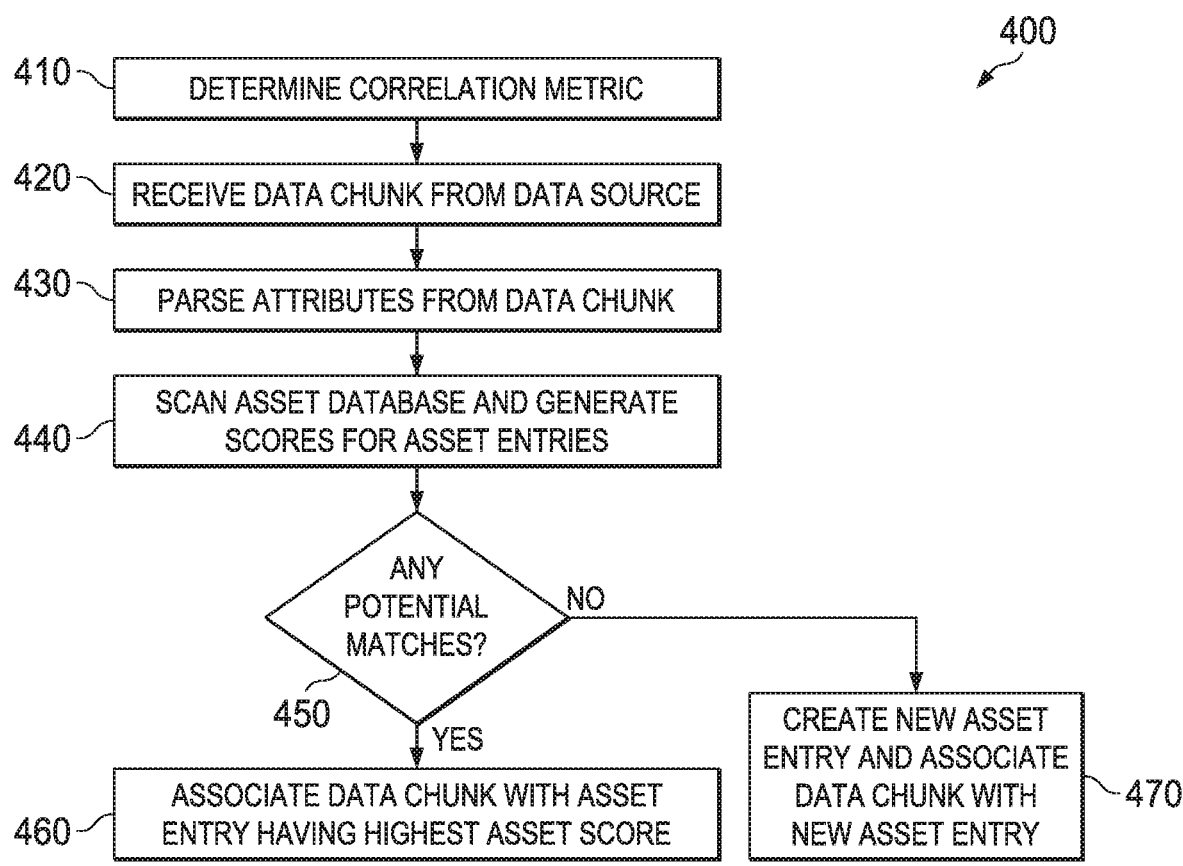
FIG. 4 shows a flowchart illustrating an exemplary process for associating a data chunk to asset entries in an asset database.

FIG. 4 shows a flowchart illustrating an exemplary process 400 for associating a data chunk to asset entries in an asset database. The process 400 may be implemented to identify an asset to which the data chunk relates, where the asset relating to the data chunk may be referred to as a target asset.

At an action 410, an asset correlation engine may receive or determine a correlation metric. The correlation metric may comprise a list of attributes and associated attribute weights, which may be determined through a training process, such as those described with respect to FIG. 3. As will be described below, the asset correlation engine may use the attribute weights within an equation (e.g., Eq. (1)) to calculate a score conveying the likelihood that a data chunk matches an asset entry. The correlation metric may also describe exclusion rules, which may establish conditions in which the attributes may be ignored or excluded from the calculation of asset scores. For example, an exclusion rule may be satisfied when a data chunk's IPv4 address falls into a range of known private IP address with short lease times. If this occurs, the IPv4 address attribute may be ignored when calculating asset scores relating to that data chunk. Further, the correlation metric may comprise a threshold value (e.g., 0) that is compared to the scores to determine potential matches of asset entries to data chunks.

Additionally, the asset database may be seeded with known asset entries and at least some of their attributes so as to accelerate the asset correlation engine's learning process.

At an action 420, the asset correlation engine may receive a data chunk from a data source. The data chunk may pertain to the target asset. As the data chunk may not readily identify the target asset, the asset correlation engine may attempt to identify the target asset, e.g., through the present process 400.

In some embodiments, agents, scanners, and even the assets themselves may serve as data sources. As an example of an asset being a data source, the asset correlation engine may receive incidental traffic from a user site that is sent by assets (e.g., without being prompted by an agent). The asset correlation engine may also receive the data chunk from a batch upload of data to the security management system or via an intermediary party.

At an action 430, the asset correlation engine or a separate parsing engine in communication with the asset correlation engine may parse the data chunk to determine attributes associated with the data chunk. In general, the list of attributes to be parsed maybe chosen and established by the correlation metric such that each data chunk may have at least one of the attributes within the list of attributes. Exemplary attributes are described above with respect to FIG. 2B.

At an action 440, the asset correlation engine may scan an asset database. Asset attributes of asset entries within the asset database may be compared to those parsed from the data chunk to generate scores for the asset entries using the correlation metric. The action 440 is further described with respect to FIG. 5 below.

At an action 450, the results of the action 440 may be analyzed to determine whether any potential matches were found. A potential match may occur when an asset entry scores above a threshold value as established by the correlation metric. If at least one potential match is found, the process 400 may continue to an action 460. Otherwise, the process 400 may continue to an action 470.

At the action 460, if only one potentially matching asset entry was found, the asset correlation engine may associate or match the data chunk with that asset entry. If multiple potential matches were found, the asset correlation engine may associate or match the data chunk with the asset entry having the highest asset score. If the data chunk includes any attributes that differ from the matched asset entry, the values of these attributes may be added to the matched asset entry. If the data chunk comprises a value for a single-valued attribute (e.g., instance ID) that is different from that of the matched asset entry, the data chunk's value may replace the value stored for the matched asset entry. In some embodiments, the asset correlation engine may note the discrepancy of a single-valued attribute and may wait to replace the value in the asset entry until multiple mismatches have occurred.

If it has been determined that the data chunk does not match any of the asset entries in the asset database, a new asset entry may be created in the asset database at the action 470, and the data chunk may be associated with the new asset entry. Asset entry creation may be performed with precautions to minimize duplicate asset entries. For example, a single asset entry creation engine may create new asset entries in a single-threaded mannerto avoid creating multiple asset entries when multiple data chunks from a new asset arrive in close succession. The asset entry creation engine may perform a final check of the asset database for an asset entry matching the data chunk before creating a new asset entry as an added precaution to avoid duplication.

Once the data chunk becomes associated with an asset entry, whether the asset entry was previously existing or newly created, the process 400 may then be completed. Subsequently, the data chunk may be further analyzed and/or stored with the new context (e.g., identification of a particular asset) provided by the matched asset entry. For example, the data chunk and identification of the related asset may be used by other engines and/or services in the secure management system to update recorded state information about the asset in a time-sensitive and incremental manner.

Figure 5:
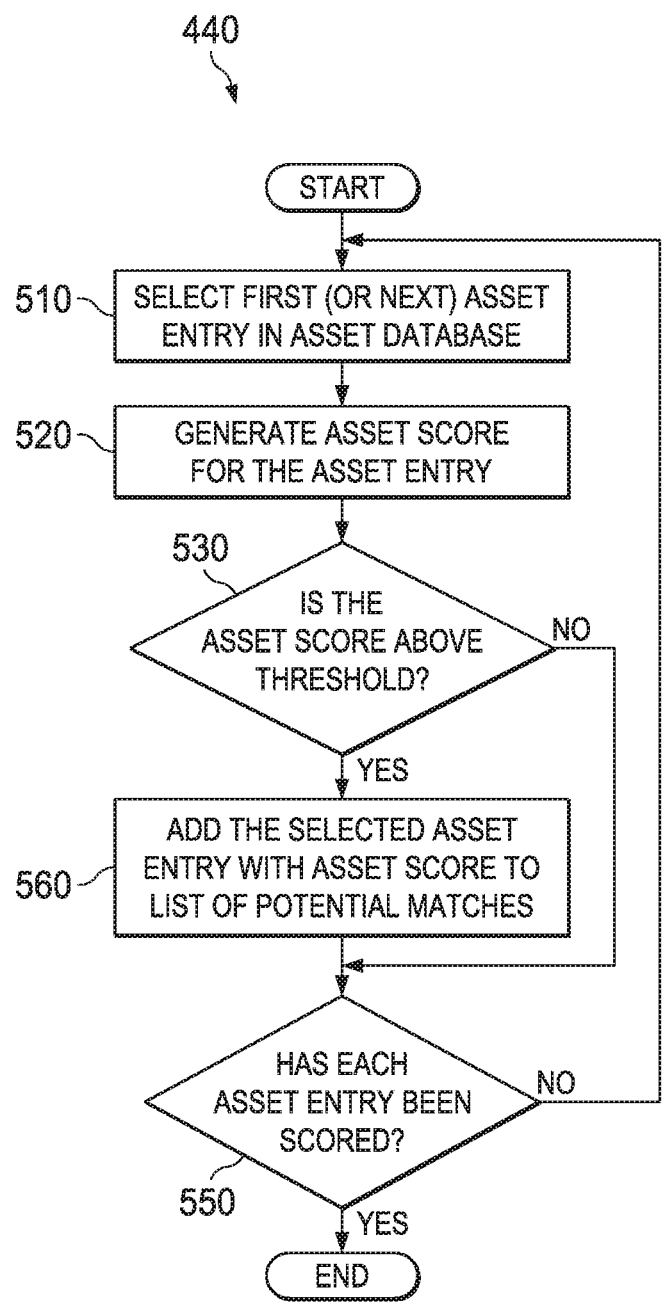
FIG. 5 shows a flowchart illustrating an exemplary process for scanning an asset database using attribute values of a data chunk and generating scores for asset entries in the asset database.

FIG. 5 shows a flowchart illustrating an exemplary process 440 for scanning an asset database using attribute values of a data chunk and generating scores for asset entries in the asset database. At an action 510, an asset correlation engine may select thefirst asset entry in the asset database. If multiple asset correlation engines are simultaneously scanning the asset database, they may each select the first asset entry in their assigned portion of the asset database. In some embodiments, the asset correlationengines may use an assignment queue where each asset correlation engine, upon having capacity, may select the next asset in the assignment queue.

At an action 520, the asset correlation engine may determine an asset score for the selected asset entry. The asset score may comprise a numerical value that, in some embodiments, may be either positive or negative. In some embodiments, the asset scoremay be calculated using Eq. (1) and will be further described with respect to FIG. 6 below.

At an action 530, the asset correlation engine may compare the asset score of the asset entry to a threshold value (e.g., 0) to determine whether or not the asset entry is a potential match for the data chunk. If the asset score is above the threshold value, the process 440 may continue to an action 540. Otherwise, the process 440 may skip the action 540 and continue to an action 550.

At the action 540, the asset entry having a sufficiently high asset score (e.g., as established by the threshold value) may be added to a list of potential matches. In some embodiments, the list of potential matches may have been initialized and/or cleared when the asset correlation engine or engines began scanning the asset database for the process 440. When multiple asset correlation engines jointly scan the asset database to find a match for a data chunk, the asset correlation engines may share the list of potential matches throughout the scanning process 440 or they may merge their private lists at the conclusion of the scanning process 440.

At the action 550, the asset correlation engine may determine whether or not each asset entry in the asset database has been scored. If all asset entries have been scored, the process 440 may then be completed. If the asset correlation engine determines that not all asset entries have been scored, the asset correlation engine may return to the action 510, where it may select the next asset entry in the asset database for scoring (e.g., through the assignment queue).

Figure 6:
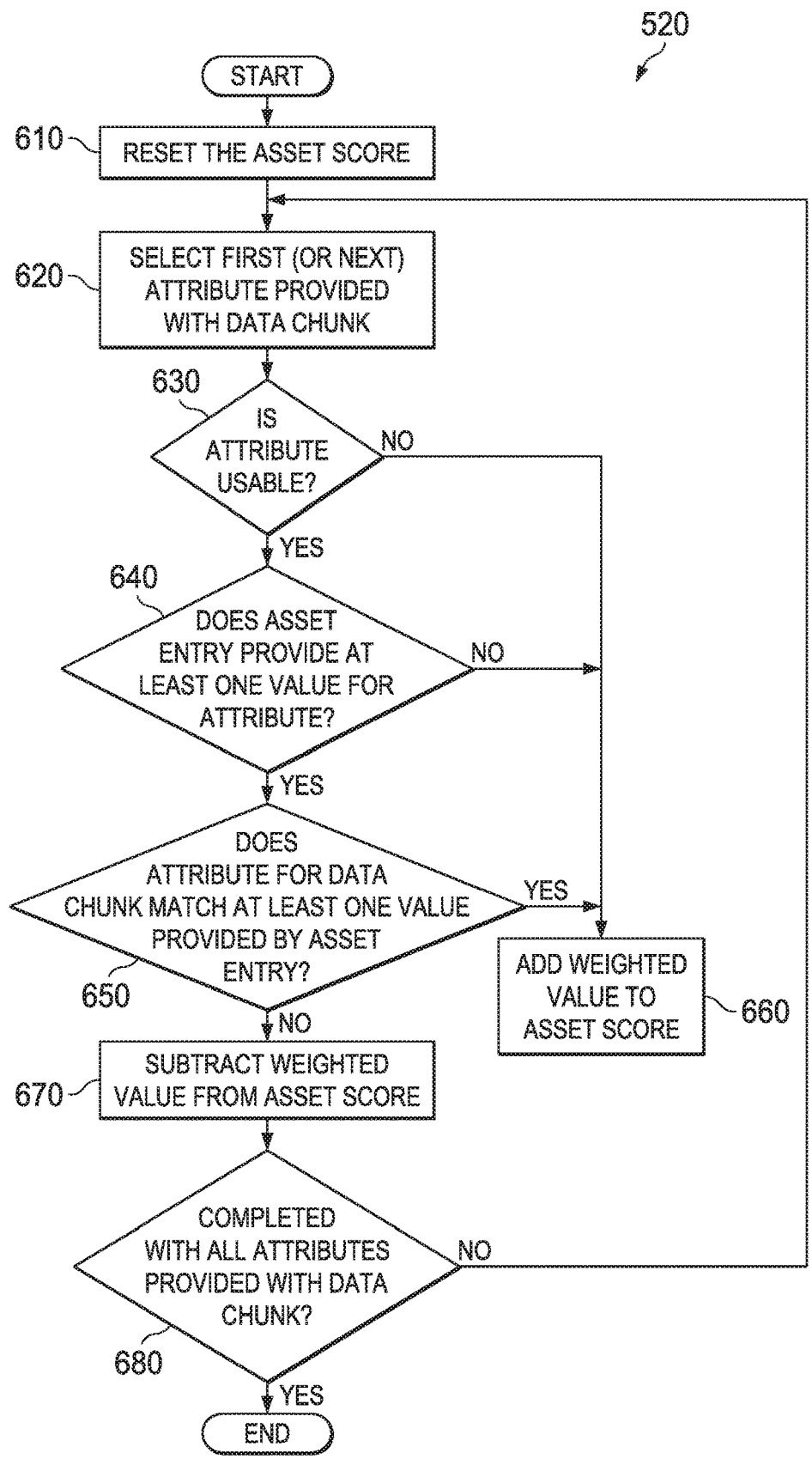
FIG. 6 shows a flowchart illustrating an exemplary process for generating an asset score for a particular asset entry and data chunk.

FIG. 6 shows a flowchart illustrating an exemplary process 520 for generating an asset score for a particular asset entry and data chunk. The process 520 may start at an action 610 where an asset correlation engine may reset the asset score (e.g., by setting it to 0)

At an action 620, the asset correlation engine may select the first attribute provided with the data chunk. For example, this may be the first attribute in a list of attributes that were parsed from the data chunk at an earlier action.

At an action 630, the asset correlation engine may determine whether the selected attribute is usable for the score calculation. As described above, a user may set an exclusion rule for an attribute, which, when satisfied, may nullify the attribute's contribution to the asset score. If the selected attribute's value satisfies the exclusion rule's condition (or conditions), the process 520 may continue to an action 680, thereby skipping any further actions for adjusting the score based on the selected attribute. Otherwise, the selected attribute may be potentially usable for the asset score calculation, the process 520 may continue to an action 640.

At the action 640, the asset correlation engine may determine whether the asset entry provides at least one value for the selected attribute. If the asset entry does provide at least one value for the attribute, the process 520 may continue to the action 650. If the asset entry does not provide any values for the attribute, a comparison may not be made for the attribute and the process may continue to the action 680.

At the action 650, the value of the selected attribute for the data chunk may be compared to one or more values provided by the asset entry for the same attribute. If the data chunk's value for the selected attribute matches at least one of the one or more values for the same attribute of the asset entry, the asset correlation engine may determine that the attributes match and the process 520 may continue to an action 660. Otherwise, the asset correlation engine may determine that the attributes do not match, and the process 520 may continue to an action 670. In some embodiments, the asset correlation engine may allow for partial or "fuzzy" matching, which may allow similar values to be considered a match.

At the action 660, the asset correlation engine may add an attribute weight associated with the reliability of the selected attribute to the asset score of the asset entry. The attribute weight may be established by the correlation metric used by the asset correlation engine.

At the action 670, the asset correlation engine may subtract the attribute weight associated with the reliability of the selected attribute from the asset score of the asset entry. As discussed above, an attribute may have a different weight for positive matches (e.g., as applied in the action 660) and for negative matches (e.g., as applied in the action 670).

At the action 680, the asset correlation engine may determine whether or not all of the attributes provided with the data chunk have been analyzed. If all attributes have been analyzed, the process 520 may then be completed. If the asset correlation engine determines that not all asset entries have been analyzed, the asset correlation engine may return to the action 610, where it may select the next attribute associated with the data chunk for analysis.

The processes described in FIGS. 4-6 may be performed by one or more asset correlation engines, asset creation engines, other hardware, and/or software. When the processes are performed, at least in part, by software, the software may be stored in a non-volatile, machine-readable medium, such as the memory device 112 of FIG. 1.

While various embodiments in accordance with the disclosed principles have beendescribed above, it should be understood that they have been presented by way of example only, and are not limiting. Thus, the breadth and scope of the disclosure should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

It is contemplated that the engines, scanners, databases, memory devices, and other elements be provided according to the structures disclosed herein in integrated circuits of any type to which their use commends them, such as ROMs, RAM (random access memory) such as DRAM (dynamic RAM), and video RAM (VRAM), PROM (programmable ROM), EPROM (erasable PROM), EEPROM (electrically erasable PROM), EAROM (electrically alterable ROM), caches, and other memories, and to microprocessors and microcomputers in all circuits including ALUs (arithmetic logic units), control decoders, stacks, registers, input/output (I/O) circuits, counters, and to general purpose microcomputers, RISC (reduced instruction set computing), CISC (complex instruction set computing) and VLIW (very long instruction word) processors, and to analog integrated circuits such as digital to analog converters (DACs) and analog to digital converters (ADCs). ASICS, PLAs, PALs, gate arrays, and specialized processors such as digital signal processors (DSP), graphics system processors (GSP), synchronous vector processors (SVP), image system processors (ISP), as well as testability and emulation circuitry for them, all represent sites of application of the principles and structures disclosed herein.

Implementation is contemplated in discrete components or fully integrated circuits in silicon, gallium arsenide, or other electronic materials families, as well as in other technology-based forms and embodiments. It should be understood that various embodiments of the invention can employ or be embodied in hardware, software, microcoded firmware, or any combination thereof. When an embodiment is embodied, at least in part, in software, the software may be stored in a non-volatile, machine-readable medium.

Various terms used in the present disclosure have special meanings within the present technical field. Whether a particular term should be construed as such a "term of art" depends on the context in which that term is used. "Connected to," "in communication with," "associated with," or other similar terms should generally be construed broadly to include situations both where communications and connections are direct between referenced elements or through one or more intermediaries between the referenced elements. These and other terms are to be construed in light of the context in which they are used in the present disclosure and as one of ordinary skill in the art would understand those terms in the disclosed context. The above definitions are not exclusive of other meanings that might be imparted to those terms based on the disclosed context.

Words of comparison, measurement, and timing such as "at the time," "immediately," "equivalent," "during," "complete," "identical," and the like should be understood to mean "substantially at the time," "substantially immediately," "substantially equivalent," "substantially during," "substantially complete," "substantially identical," etc., where "substantially" means that such comparisons, measurements, and timings are practicable to accomplish the implicitly or expressly stated desired result.

Additionally, the section headings herein are provided for consistency with the suggestions under 37 C.F.R. 1.77 or otherwise to provide organizational cues. These headings shall not limit or characterize the subject matter set forth in any claims that may issue from this disclosure. Specifically and by way of example, although the headings refer to a "Field of the Disclosure," such claims should not be limited by the language chosen under this heading to describe the so-called technical field. Further, a description of a technology in the "Background" is not to be construed as an admission that technology is prior art to any subject matter in this disclosure. Neither is the "Summary" to be considered as a characterization of the subject matter set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A system for identifying target assets, the system comprising:
    an asset correlation engine executable by one or more computing device processors and in communication with an asset database,
    wherein the asset database is operable to store asset entries, wherein at least one asset entry in the asset database is associated with an asset,
    wherein the asset correlation engine is operable to:
        access correlation information comprising attribute information associated with one or more assets, and
    wherein the system is operable to:
        receive data associated with a target asset of a network, wherein the target asset comprises at least one of a desktop workstation, a server, a laptop, a tablet, a mobile phone, an application, a virtual machine, and a computing device;
        parse the data to identify a target attribute associated with the target asset, wherein the target attribute comprises at least one of an IP address attribute, a DNS name attribute, a network attribute, an operating system attribute, a NetBIOS name attribute, an agent identification attribute, a software attribute, a hardware attribute, and an instance identification attribute;
        access exclusionary rules associated with attributes;
        determine, based on the exclusionary rules associated with the attributes, whether the target attribute is excludable;
        in response to determining the target attribute is not excludable, determine, based on the correlation information, target attribute information associated with the target attribute;
        determine, based on the target attribute information associated with the target attribute, target asset information, wherein a second target attribute excluded by the exclusionary rules is not used in determining the target asset information;
        determine whether the target asset information at least partially correlates with an asset entry in the asset database; and
        in response to determining the target asset information at least partially correlates with the asset entry in the asset database, process the target asset information.

2. The system of claim 1, wherein the attribute information comprises attribute weight information, and wherein the target attribute information comprises target attribute weight information.

3. The system of claim 1, wherein at least one of the correlation information, the attribute information, or the target attribute information is associated with a category.

4. The system of claim 1, wherein the processing the target asset information comprises associating the target asset information with the at least partially correlated asset entry in the asset database.

5. The system of claim 1, wherein the target asset information is comprised in a digital fingerprint.

6. The system of claim 1, wherein the correlation information or the attribute information is generated using an iterative training process.

7. The system of claim 6, wherein the iterative training process comprises iteratively testing candidate attribute weight information, and determining whether the candidate attribute weight information leads to an expected correlation result for mapping test target asset information with test asset entry information.

8. The system of claim 1, wherein the asset correlation engine is further operable to receive the data from an agent operable to scan the target asset.

9. The system of claim 8, wherein the agent comprises or is a cloud agent.

10. The system of claim 1, wherein the target asset comprises at least one of the desktop workstation, the server, the laptop, the tablet, the mobile phone, the application, the virtual machine, and the computing device.

11. A method for identifying target assets, the method comprising:
    accessing, using one or more computing device processors, correlation information comprising attribute information associated with one or more assets;
    accessing, using the one or more computing device processors, exclusionary rules associated with attributes;
    receiving, using the one or more computing device processors, data associated with a target asset of a network, wherein the target asset comprises at least one of a desktop workstation, a server, a laptop, a tablet, a mobile phone, a virtual machine, and a computing device;

parsing, using the one or more computing device processors, the data associated with the target asset of the network to identify a target attribute associated with the data, wherein the target attribute comprises at least one of an IP address attribute, a DNS name attribute, a network attribute, an operating system attribute, a NetBIOS name attribute, an agent identification attribute, a software attribute, a hardware attribute, and an instance identification attribute;

determining, using the one or more computing device processors, based on the exclusionary rules associated with the attributes, whether the target attribute is excludable;

in response to determining the target attribute is not excludable, determining, using the one or more computing device processors, based on the correlation information, target attribute information associated with the target attribute;

determining, using the one or more computing device processors, based on the target attribute information associated with the target attribute, target asset information, wherein a second target attribute excluded by the exclusionary rules is not used in generating the target asset information;

determining, using the one or more computing device processors, whether the target asset information at least partially correlates with an asset entry in an asset database, wherein the asset database is operable to store asset entries, wherein at least one asset entry in the asset database is associated with an asset; and in response to determining the target asset information at least partially correlates with the asset entry in the asset database, processing, using the one or more computing device processors, the target asset information.

12. The method of claim 11, wherein the data is received using a cloud-based agent.

13. The method of claim 11, wherein the processing the target asset information comprises associating the target asset information with the at least partially correlated asset entry in the asset database.

14. The method of claim 13, wherein the attribute information comprises attribute weight information, and wherein the target attribute information comprises target attribute weight information.

15. The method of claim 11, further comprising in response to determining the target asset information does not at least partially correlate with the asset entry in the asset database, creating a new asset entry in the asset database, wherein the new asset entry comprises at least a portion of the target asset information.

16. The method of claim 11, wherein determining whether the target asset information at least partially correlates with the asset entry in the asset database, comprises scanning, based on at least a portion of the target asset information or the target attribute information, the asset entries in the asset database, and determining at least partially matching or correlating asset entries.

17. The method of claim 11, wherein determining whether the target asset information at least partially correlates with the asset entry in the asset database, comprises determining, based on the target asset information or the target attribute information, and using at least one fuzzy matching technique, whether the target asset information at least partially correlates with the at least one asset entry in the asset database.

18. A method for identifying target assets, the method comprising:

accessing, using one or more computing device processors, exclusionary rules associated with attributes;

receiving, using the one or more computing device processors, data associated with a target asset of a network, wherein the target asset comprises at least one of a desktop workstation, a server, a laptop, a tablet, a mobile phone, a virtual machine, and a computing device;

parsing, using the one or more computing device processors, the data associated with the target asset of the network to identify a target attribute associated with the data, wherein the target attribute comprises at least one of an IP address attribute, a DNS name attribute, a network attribute, an operating system attribute, a NetBIOS name attribute, an agent identification attribute, a software attribute, a hardware attribute, and an instance identification attribute;

determining, using the one or more computing device processors, target attribute information associated with the target attribute;

determining, using the one or more computing device processors, based on the target attribute information associated with the target attribute, a digital fingerprint for the target asset;

determining, using the one or more computing device processors, based on the digital fingerprint for the target asset, whether a target asset information associated with the target attribute information at least partially correlates with an asset entry in an asset database, wherein the asset database is operable to store asset entries, wherein at least one asset entry in the asset database is associated with an asset.

19. The method of claim 18, further comprising in response to determining the target asset information at least partially correlates with the asset entry in the asset database, identifying, using the one or more computing device processors, the target asset.

20. The method of claim 18, wherein the data is received using a cloud-based agent.

* * * * *